No. 837,149. PATENTED NOV. 27, 1906.
N. W. & A. C. THOMPSON.
COMBINED HARVESTER AND THRESHER.
APPLICATION FILED APR. 20, 1904.

5 SHEETS—SHEET 2.

WITNESSES:

INVENTORS
Nelson W. Thompson
Andrew C. Thompson
Victor J. Evans
Attorney

No. 837,149. PATENTED NOV. 27, 1906.
N. W. & A. C. THOMPSON.
COMBINED HARVESTER AND THRESHER.
APPLICATION FILED APR. 20, 1904.

5 SHEETS—SHEET 3.

Witnesses
Edwin F. McKee
W. H. Clarke.

Inventors
N. W. Thompson
A. C. Thompson
By
Victor J. Evans
Attorney

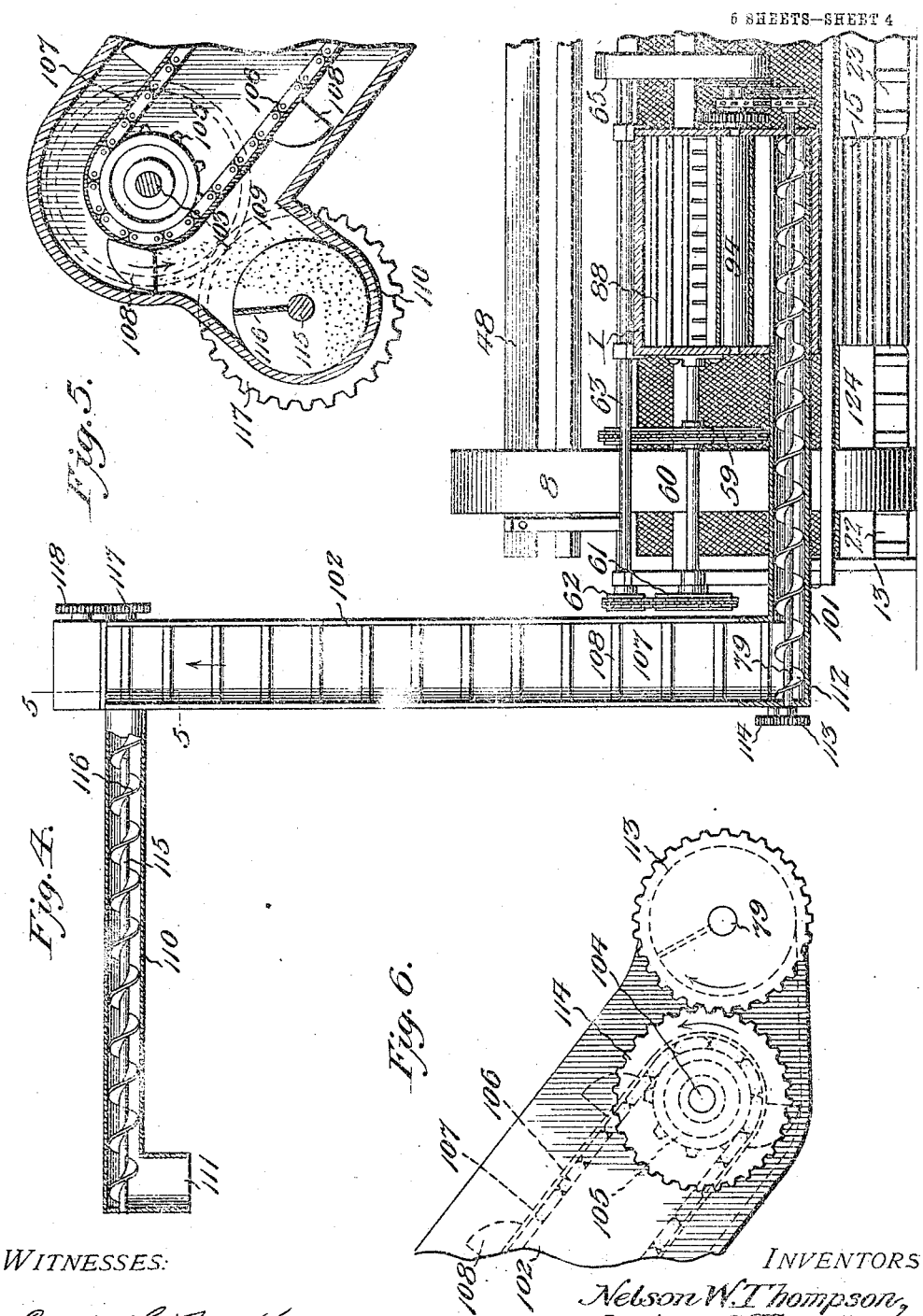

No. 837,149. PATENTED NOV. 27, 1906.
N. W. & A. C. THOMPSON.
COMBINED HARVESTER AND THRESHER.
APPLICATION FILED APR. 20, 1904.
5 SHEETS—SHEET 5.
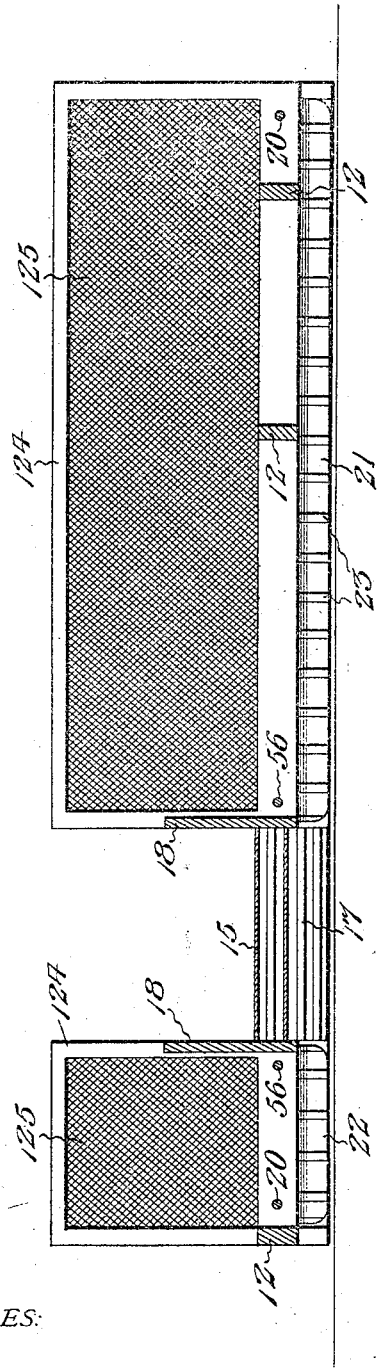
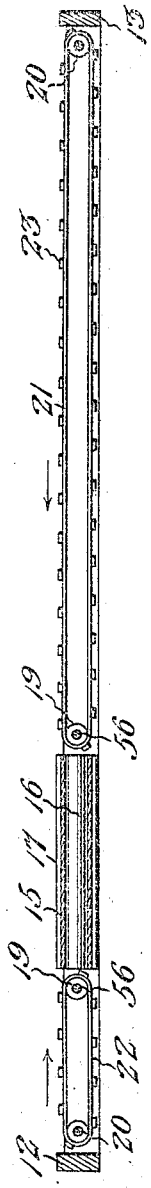
WITNESSES:
Edwin G. McKee
Herbert D. Lawson
INVENTORS
Nelson W. Thompson,
Andrew C. Thompson,
BY Victor J. Evans
Attorney

UNITED STATES PATENT OFFICE.

NELSON W. THOMPSON AND ANDREW C. THOMPSON, OF ERSKINEVILLE, OREGON.

COMBINED HARVESTER AND THRESHER.

No. 837,149.    Specification of Letters Patent.    Patented Nov. 27, 1906.

Application filed April 20, 1904. Serial No. 204,133.

*To all whom it may concern:*

Be it known that we, NELSON W. THOMPSON and ANDREW C. THOMPSON, citizens of the United States, residing at Erskineville, in the county of Sherman and State of Oregon, have invented new and useful Improvements in a Combined Harvester and Thresher, of which the following is a specification.

Our invention has relation to improvements in harvesters; and it consists in the construction and arrangement of parts, as will be hereinafter described, and particularly pointed out in the claim.

Figure 1:
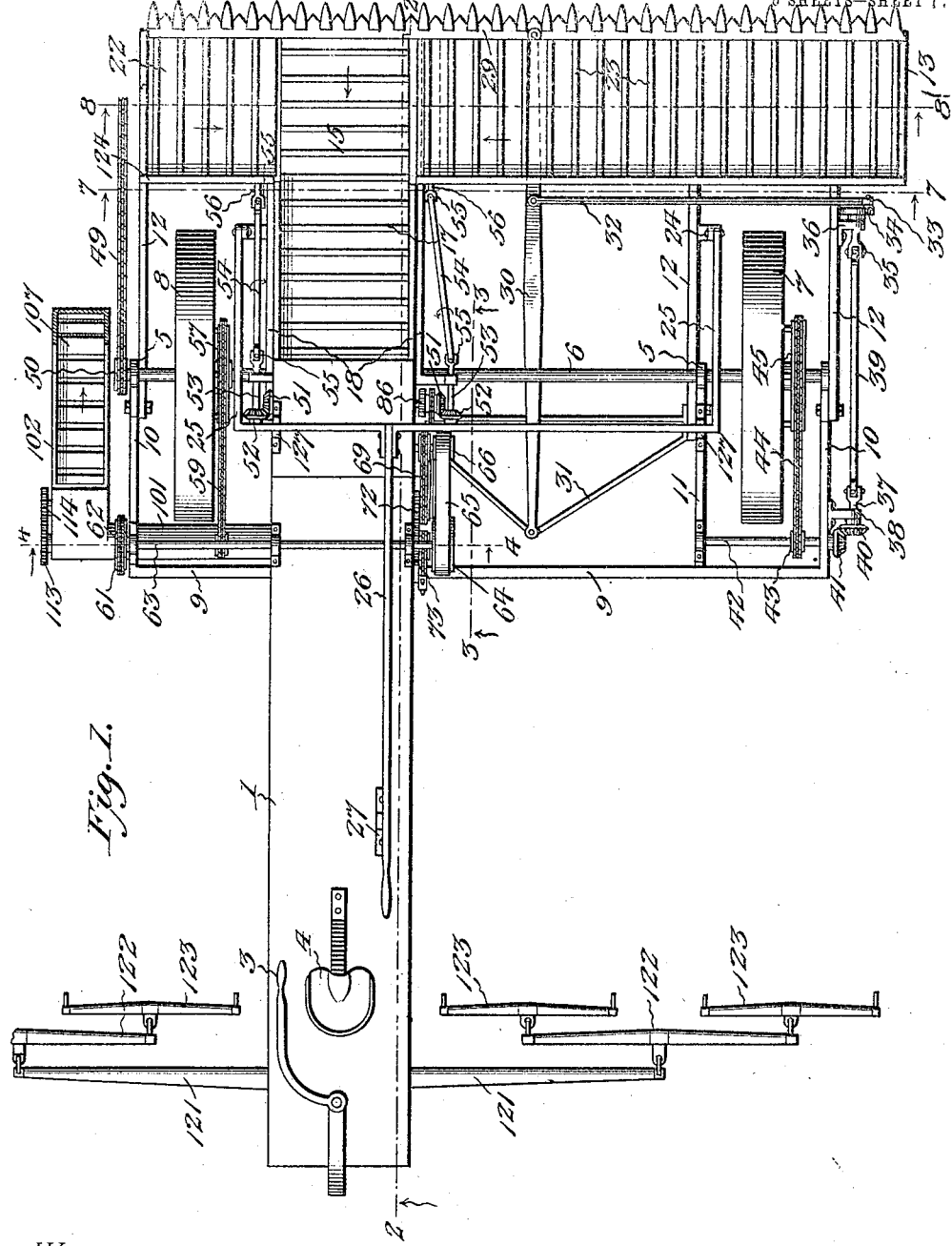
Figure 2:
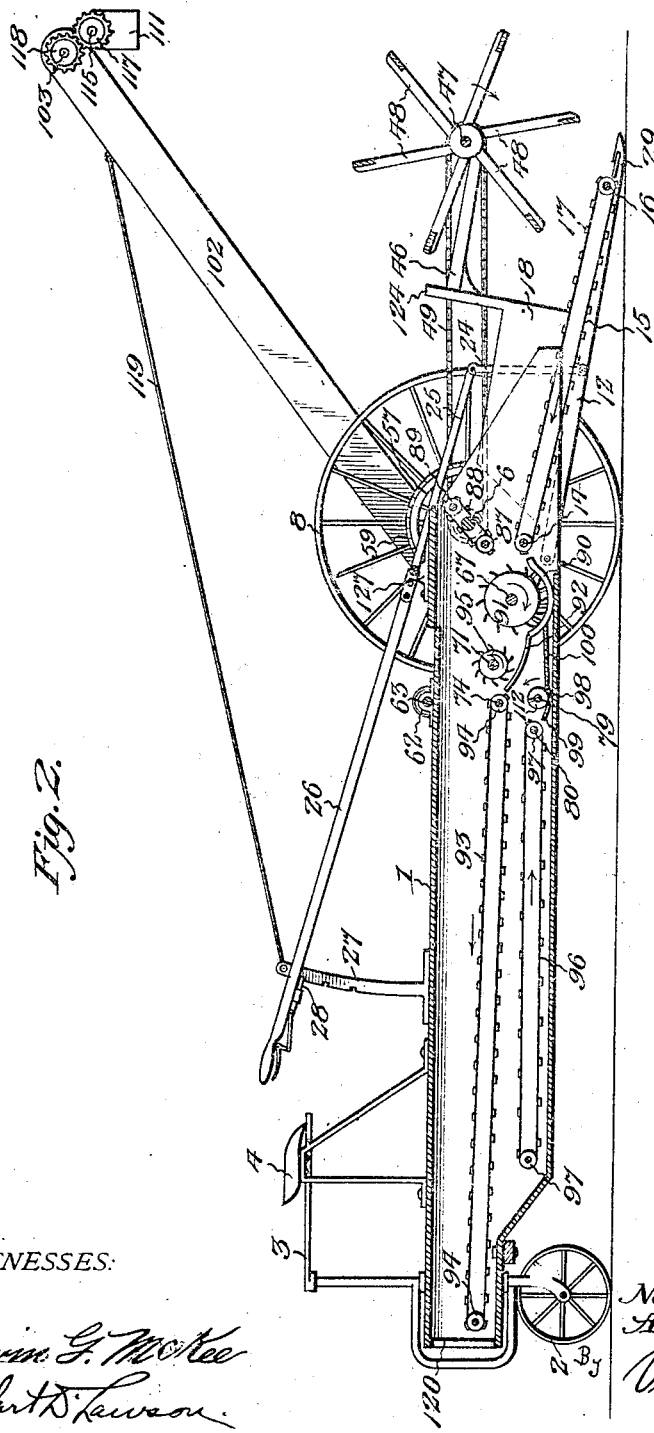
Figure 3:
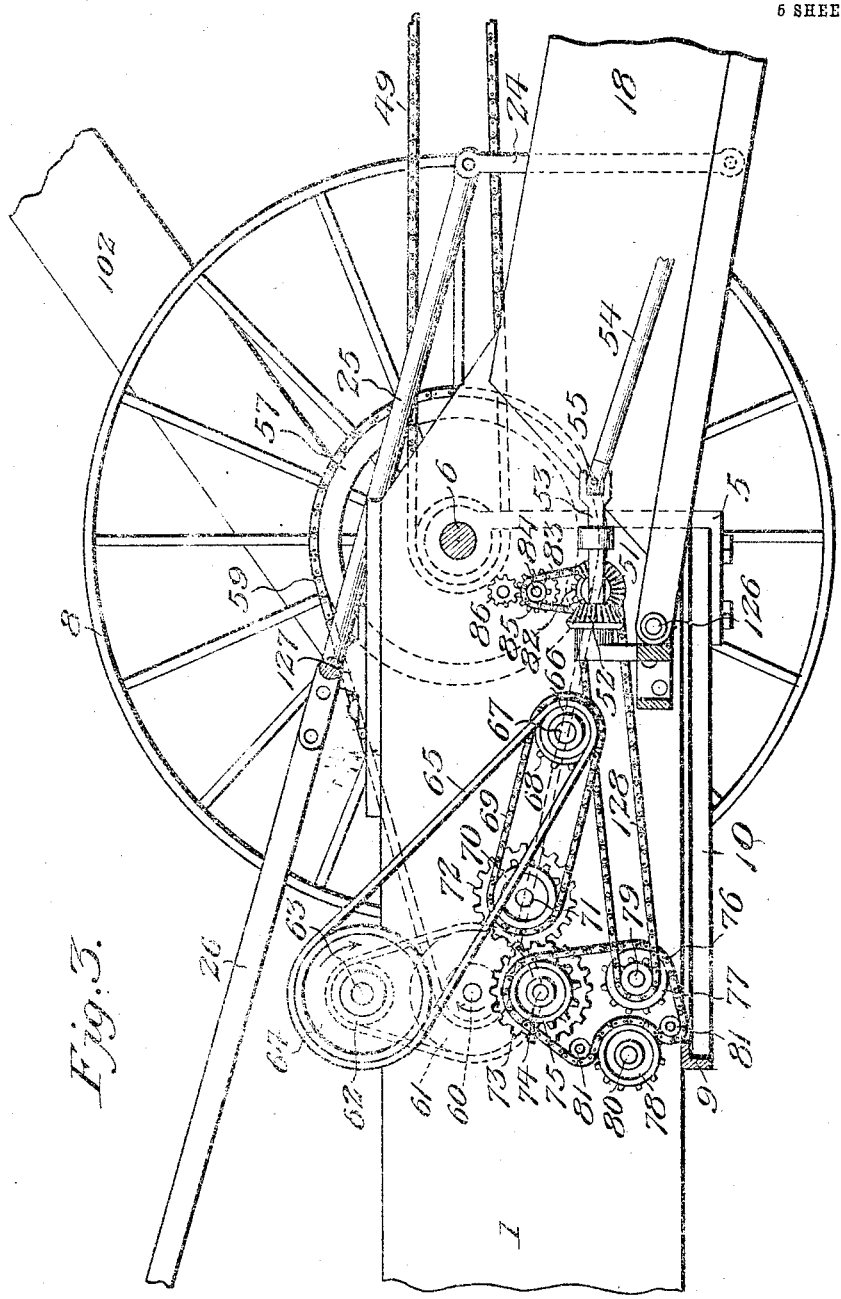

Figure 1 is a plan view of the machine with the grain-discharging mechanism broken away and the reel removed. Fig. 2 is a section on line 2 2, Fig. 1. Fig. 3 is a section on line 3 3, Fig. 1. Fig. 4 is an enlarged section on line 4 4, Fig. 1. Fig. 5 is an enlarged section on line 5 5, Fig. 4. Fig. 6 is an elevation of the lower portion of the grain-elevator and showing the mechanism for imparting motion thereto from the worm conveyer. Fig. 7 is an enlarged section on line 7 7, Fig. 1, and Fig. 8 is an enlarged section on line 8 8, Fig. 1.

Referring to the figures by numerals of reference, 1 is a casing, to the rear end of which is pivoted a tiller-wheel 2, which is adapted to be operated by means of a lever 3, extending to a point adjacent the driver's seat 4, mounted on the casing 1. This casing is substantially oblong in form and serves the purposes of a tiller-beam, and its forward end is supported upon a frame which comprises a lateral arm 9, having forwardly-projecting extensions 10 at the ends thereof and an intermediate extension 11 near one end, said extensions being connected with hangers 5, suspended from an axle 6, upon which are arranged traction-wheels 7 and 8. The extension 11 and the adjacent extension 10 are arranged at opposite sides of the traction-wheel 7. The bar 9 extends beneath the casing 1, as shown in Fig. 3. To each extension 10 and 11 is pivoted an arm 12, which projects forward, and these arms are connected at their front ends to a transversely-extending frame 13, having a novel arrangement of conveyers thereon. The forward end of the casing 1 is open, and arranged therein is a roller 14, upon which is mounted an endless conveyer or apron 15, which extends downward at an incline and over a roller 16, adjacent the front edge of the frame 13. The conveyer has transversely-extending bars or cleats 17 upon its working face, and that portion of this conveyer which is located between the frame 13 and the casing 1 is provided with side boards 18, which serve to prevent any material which may be in position thereon from falling to either side.

Journaled within the frame 13 at each side of the conveyer 15 are rollers 19, and rollers 20 are journaled within the frames near the ends thereof. Upon these rollers are arranged endless conveyers 21 and 22, respectively, which are provided with transversely-extending bars or cleats 23 upon their working faces. Two of the arms 12 are provided with links 24, to which are pivoted the ends of a yoke 25, which is provided with a handle 26, extending over the casing 1 and adapted to be locked to a toothed segment 27 in any suitable manner, as by means of a spring-pressed pawl 28 of the ordinary construction. A reciprocating cutter-bar 29 is arranged along the front edge of the frame 13 and is connected to the forward end of a lever 30, the rear end of which is pivoted to a frame 31, secured in any suitable manner to one of the arms 12 and to one of the side boards 18. At a point between the ends of this lever is pivotally connected a rod 32, which is mounted on a wrist-pin 33, eccentrically connected to a disk 34. This disk is secured to one end of a shaft 35, journaled in a suitable bracket 36, which is secured to one of the arms 12, and a second shaft 37 is journaled in a bracket 38, extending from the adjacent arm 10. These two shafts 35 and 37 are connected by means of a rod 39, the joints between the rods and shaft being of such a character as to permit motion to be transmitted from one shaft to the other, whether or not the same are in alinement. A beveled gear 40 is secured to the shaft 37 and meshes with a similar gear 41, arranged on a shaft 42, which is journaled in the adjoining extension and the extension 11. This shaft has a sprocket-wheel 43 thereon, upon which is arranged a chain 44, which extends over a large sprocket 45, connected to and revoluble with the traction-wheel 7.

Arms 46 extend forward from the side board 18 and serve to support a shaft 47, upon which is arranged a reel 48, which is located above and slightly in advance of the conveyers 21 and 22, so as to project forward beyond the cutter-bar 29. A sprocket is located on the shaft 47, and a chain 49 is mounted thereon and also on a sprocket 50, arranged at one end of the axle 6.

A beveled gear 51 is secured to each end of the shaft 14 of the rearwardly-extending conveyer 15. Each of these gears meshes with a similar gear 52, arranged on a shaft 53. Rods 54 are connected by universal joints 55 to the shafts 53 and to the shafts 56 of the rollers 19. It will thus be seen that when motion is transmitted to one of the conveyers all of them will be moved in unison in the direction of the arrows in Fig. 1. A large sprocket 57 is connected to and rotates with the traction-wheel 8, and arranged thereon is a chain 59, which serves to transmit rotary motion to a shaft 60, which is journaled upon one of the extensions 10 and one side of the casing 1. A sprocket 61 is secured to this shaft and has a chain 62 thereon, which serves to transmit motion to a shaft 63, journaled on the machine and extending over the casing 1. A pulley 64 is secured to one end of this shaft, and a belt 65 serves to transmit rotary motion therefrom to a pulley 66, arranged at one end of a shaft 67, which extends transversely through the casing 1. A sprocket 68 is secured to this shaft, and a chain 69 is mounted thereon and also upon a sprocket 70, arranged on a shaft 71, extending through the casing 1. A gear 72 is secured to shaft 71 and meshes with a gear 73, which is secured to a shaft 74. This shaft extends through the casing 1 and has a sprocket 75 thereon, upon which is mounted a chain 76, which engages sprockets 77 and 78, mounted on shafts 79 and 80, respectively. These shafts extend transversely through the casing 1. Idler-rollers 81 are so arranged in relation to the sprockets 77 and 78 as to cause the chain 76 to rotate them in opposite directions, as shown by arrows in Fig. 3.

Roller 14 has a sprocket 82 connected thereto, and a chain 83 serves to transmit rotary motion therefrom to a short shaft 84, upon which is arranged a gear 85, which gear meshes with a second gear 86, which is secured to a shaft 87, extending transversely of the casing 1 at a point above the shaft 14. A feed-apron 88 is adapted to be operated by the shaft 87, said apron extending over a roller 89, journaled within the casing near the top thereof, and so located as to hold the apron in an inclined position.

A toothed concave 90 is within and extends transversely of the casing 1, directly under the inner upper end of the conveyer 15 and below the shaft 67. Upon this shaft is arranged a threshing-cylinder 91, which is adapted to work in conjunction with the concave 90 to thoroughly separate the grain from the straw. An inclined board 92 extends from the concave upward to the forward end of an endless straw-carrier 93, which is arranged on the rollers 94, one of which is secured to the shaft 74 before referred to. A beater 95 is secured within the casing 1 upon shaft 71 and directly above the inclined board 92. An endless grain-conveyer 96 is arranged under and extends longitudinally of the carrier 93 and is mounted on rollers 97, one of which is secured to shaft 80. At the forwar end of this conveyer and adjacent the shaft 80 is a trough 98, having inclined boards 99 and 100 at opposite sides thereof, the last-mentioned board communicating with the concave 90 and being adapted to d ect grain therefrom into the trough 98. The trough communicates at one end with a tubular extension 101, which projects from one side of the machine and communicates at its outer end with the lower end of an inclined frame 102. Journaled in the upper and lower ends of this frame are shafts 103 and 104, respectively, and arranged on these shafts are sprockets 105, upon which are mounted chains 106. To these chains is secured an endless apron 107, having buckets 108, which are adapted to move downward into the outer end of the tubular extension 101 and upward into position over an outlet 109, formed in the upper face of the inner end of a tubular arm 110, which extends laterally from the upper end of the inclined frame 102 and has a downwardly extending outlet-pipe 111.

The shaft 79, hereinbefore referred to, is journaled within the ends of the tubular extension 101 and the trough 98 and has a worm 112 thereon, which serves to convey grain from the trough to the outer end of the extension 101 and into position in the path of the buckets 108. A gear 113 is secured to the outer end of shaft 79 and meshes with a gear 114, which is connected to and rotates with the lower shaft 104. A shaft 115 is journaled within and extends longitudinally of a cylindrical extension 110 and has a worm 116 thereon. A gear 117 is secured to this shaft and meshes with a gear 118, secured to the shaft 103. A supporting-cable 119 is preferably connected at opposite ends to the inclined frame 102 and to the segment 27. An outlet 120 is formed at the rear end of the casing 1 directly in rear of the straw-carrier 93. To the rear end of the casing is secured a whiffletree 121, the ends of which are connected to doubletrees 122 and swingletrees 123. Any desired number of whiffletrees may be connected to the machine for the purpose of accommodating a desired number of draft-animals. Upright frames 124 are secured along the rear edges of the frame 13, and arranged upon these frames 124 are screens 125, which serve to prevent the material deposited upon the aprons 21 and 22 from falling upon the ground after being thrown backward by the reel 48.

As shown in Fig. 3, the side boards 18 are pivotally connected to the sides of the casing 1 by means of pivot-pins 126, so as to permit said boards to be swung in vertical lines in unison with the conveyers 15, 21, and 22. As will be readily understood, the draft-animals are harnessed to the whiffletrees 123 and are located in rear of the traction-wheels 7 and 8 and the cutting mechanism. The machine may be guided in a desired direction by means of the lever 3, which is arranged adjacent the driver's seat 4. As the handle 26 also extends to a point adjacent said seat, it can be readily raised or lowered by the operator. As the yoke 25 is fulcrumed upon brackets 127, arranged on the forward portion of the casing 1 and on the extension 11, it is obvious that by pressing downward upon the handle 26 the links 24 are raised, and thereby cause the arms 12 to swing upward upon their pivots. It will therefore be seen that by means of the handle 26 the frame 13 and the conveyers and cutter-bar connected thereto can be raised or lowered to a desired elevation. As the reel is connected to these movable parts, it will also be carried therewith, as is obvious. As the machine is drawn forward wheels 7 and 8 will rotate, and motion will be transmitted from the wheel 7 through sprockets 45 and 43 and chain 44 to the shaft 42 and thence through gears 41 and 40 to shafts 37 and 35 to the disk 34. As this disk revolves a reciprocating movement will be imparted to rod 32, and lever 30 will be moved back and forth upon its pivot, thereby causing the cutter-bar 29 to reciprocate.

The axle rotates with the wheel 8, and it is therefore obvious that the chain 49, which is mounted on the sprocket 50 on said axle, will cause the reel 48 to turn in the direction of the arrow in Fig. 2, and this reel will throw the cut grain on the conveyers 15, 21, and 22. The screens 125 will, as is obvious, prevent the grain from being thrown by the reel past the conveyers. The sprocket 57, which is connected to the wheel 8, will obviously turn therewith in the direction of the arrow, Fig. 3, and the chain 59 thereon will transmit rotary motion to the shaft 60. Chain 62 will transmit this motion to shaft 63, and the belt 65 causes this shaft to rotate the shaft 67 of the threshing-cylinder 91. As hereinbefore described, motion is imparted from this shaft to the shaft 71 of the beater and thence through gears 72 and 73 to the shaft of the straw-carrier. A chain 76 transmits rotary motion from the shaft 74 to the shafts 80 and 79 of the grain-carrier and worm, respectively. A chain 128 is mounted on the shaft 79 and the shaft of the roller 14. This chain serves to transmit rotary motion from said shaft 79 to the roller. Chain 83 and gears 85 and 86 cause the feed-apron to travel upon the rollers 87 and 89, and the gears 51 and 52 serve to rotate the shafts 53. Rotary motion is transmitted from these shafts to the shafts 56 of the rollers 19 of conveyers 21 and 22 through the rods 54. It will thus be seen that the two conveyers will be moved toward each other, as shown by arrows in Fig. 1, simultaneously with the backward movement of the central conveyer 15. We have shown the direction of movement of the several parts by arrows.

From the foregoing it will be seen that after the cut grain has been deposited on the conveyers 21 and 22 it will be carried to the conveyer 15 and thence backward and between the side boards 18 to the threshing-cylinder 91. The feed-apron 88 will, as is obvious, serve to direct the straw downward between the cylinder and the concave 90. Any grain which may become separated from the straw in the concave will pass down the inclined board 100 into the trough 98. The beater 95 will then act upon the straw and throw it upward upon the carrier 93, by which it will be conveyed to the outlet 120. Any grain which may be separated by the beater moves downward upon the inclined board 92 into the concave and thence outward on the board 100 to the trough 68. Any grain which may become separated from the straw while on the carrier will fall downward upon the conveyer, and as this conveyer travels in the direction of the arrow, Fig. 2, in view of the gearing provided therefor it is obvious that the grain will be conducted thereby to board 99 and be guided into the trough 98. The worm 112 carries the grain from the trough 98 through the tubular extension 101 and into the path of the buckets 108. These buckets will carry the grain upward and discharge it into the outlet 109, from where it will be carried by the worm 116 to the outlet 111. Any suitable receptacle may be arranged under this outlet for the reception of the grain. It will be seen that by providing the belt 65 and the pulleys 64 and 66 should any portion of the machinery be stopped for any reason injury to the machine is prevented, as the belt will in this event slip over the pulleys until the machine can be brought to a standstill.

In the foregoing description we have shown the preferred form of our invention; but we do not limit ourselves thereto, as we are aware that modifications may be made therein without departing from the spirit or sacrificing any of the advantages thereof, and we therefore reserve the right to make such changes as fairly fall within the scope of our invention.

Having thus described the invention, what is claimed as new is—

In a machine of the character described, the combination with a longitudinal casing having threshing mechanism therein provided with draft appliances and a tiller-wheel at its rear end, an inlet, and an outlet to the casing and means for conveying material to the outlet, of traction-wheels, an axle thereon serving to support the casing, mechanism connected to one of the traction-wheels for operating the threshing and conveying mechanism, an adjustable frame supported by the axle, a cutter-bar thereon, mechanism operated by one of the traction-wheels for reciprocating the cutter-bar, a conveyer upon the frame and extending from the cutter-bar to the inlet in the casing, conveyers upon the frame at opposite sides of the first-mentioned conveyer, mechanism for operating the conveyers, and a reel supported above the conveyers and arranged slightly in advance of the same so as to project forwardly beyond the cutter-bar, substantially as specified.

In testimony whereof we affix our signatures in presence of two witnesses.

NELSON W. THOMPSON.
ANDREW C. THOMPSON.

Witnesses:
W. STANLEY,
L. BARNUM.